(12) United States Patent
Tang et al.

(10) Patent No.: US 11,136,878 B2
(45) Date of Patent: Oct. 5, 2021

(54) MOVEMENT-SYNCHRONIZED WELLBORE INSPECTION SYSTEM AND MOVEMENT SYNCHRONIZATION CONTROL METHOD THEREOF

(71) Applicant: China University of Mining and Technology, Jiangsu (CN)

(72) Inventors: Chaoquan Tang, Jiangsu (CN); Gongbo Zhou, Jiangsu (CN); Hongwei Tang, Jiangsu (CN); Zhenzhi He, Jiangsu (CN); Gang Zhang, Jiangsu (CN); Wei Li, Jiangsu (CN); Fan Jiang, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 17/043,682

(22) PCT Filed: Nov. 11, 2019

(86) PCT No.: PCT/CN2019/116973
§ 371 (c)(1),
(2) Date: Sep. 30, 2020

(87) PCT Pub. No.: WO2021/056712
PCT Pub. Date: Apr. 1, 2021

(65) Prior Publication Data
US 2021/0277765 A1    Sep. 9, 2021

(30) Foreign Application Priority Data
Sep. 23, 2019    (CN) .......................... 201910901136.2

(51) Int. Cl.
*E21B 47/00* (2012.01)
*B25J 11/00* (2006.01)
(Continued)

(52) U.S. Cl.
CPC ............... *E21B 47/00* (2013.01); *B25J 11/00* (2013.01); *G01M 3/005* (2013.01); *G01M 3/38* (2013.01); *G01M 11/081* (2013.01)

(58) Field of Classification Search
CPC .... G01M 11/081; G01M 13/00; G01M 3/005; G01M 3/38; G01M 7/022; G01M 7/06;
(Continued)

(56) References Cited

U.S. PATENT DOCUMENTS 5,203,646 A * 4/1993 Landsberger ........... B08B 9/049
104/138.2
8,619,134 B2 * 12/2013 Christ ....................... B63C 11/52
348/84
(Continued)

FOREIGN PATENT DOCUMENTS

| CN | 102682492 | 9/2012 |
| CN | 105035200 | 11/2015 |

(Continued)

OTHER PUBLICATIONS

"International Search Report (Form PCT/ISA/210) of PCT/CN2019/116973," dated Jun. 9, 2020, pp. 1-4.

*Primary Examiner* — Nimeshkumar D Patel
*Assistant Examiner* — Gedeon M Kidanu
(74) *Attorney, Agent, or Firm* — JCIPRNET

(57) ABSTRACT

A movement-synchronized wellbore inspection system and a movement-synchronization control method thereof are disclosed. The wellbore inspection system comprises a rope-climbing robot, a wire rope, a ground wire rope moving device, a ground wire rope moving track, an underground wire rope moving device, an underground wire rope moving track, an inertial sensor and a control device. An upper end of the wire rope is connected to the ground wire rope moving device, and an lower end of the wire rope passes through the rope-climbing robot and is then connected to the under- (Continued)

ground wire rope moving device. The control device controls the underground and ground wire rope moving devices to move in synchronization, and then the inertial sensor carried on the rope-climbing robot detects posture data of the wire rope and transmits the data to the control device.

6 Claims, 5 Drawing Sheets

(51) Int. Cl.
  *G01M 3/00* (2006.01)
  *G01M 3/38* (2006.01)
  *G01M 11/08* (2006.01)

(58) Field of Classification Search
  CPC ...... G01B 11/00; G01B 17/08; G01B 5/0004; G01B 5/0025; B61B 7/06; B61C 3/00; F16H 1/14; F16H 1/16; H02K 11/38; H02K 5/04; H02K 7/081; H02K 7/116
  See application file for complete search history.

(56) References Cited

U.S. PATENT DOCUMENTS

2017/0012413 A1* 1/2017 Barbosa .................. H02G 1/02
2017/0297589 A1* 10/2017 Zhou ........................ B61C 3/00

FOREIGN PATENT DOCUMENTS

| CN | 207099186 |   | 3/2018 |
| CN | 108896262 |   | 11/2018 |
| CN | 108896262 A | * | 11/2018 |
| WO | 2017161064 |   | 9/2017 |

* cited by examiner

MOVEMENT-SYNCHRONIZED WELLBORE INSPECTION SYSTEM AND MOVEMENT SYNCHRONIZATION CONTROL METHOD THEREOF

CROSS-REFERENCE TO RELATED APPLICATION

This application is a 371 of international application of PCT application serial no. PCT/CN2019/116973, filed on Nov. 11, 2019, which claims the priority benefit of China application no. 201910901136.2, filed on Sep. 23, 2019. The entirety of each of the above mentioned patent applications is hereby incorporated by reference herein and made a part of this specification.

BACKGROUND

Technical Field

The present invention relates to mechanical engineering technologies, and in particular, to a movement-synchronized wellbore inspection system and a movement synchronization control method thereof.

Description of Related Art

A wellbore inspection system is formed by a rope-climbing robot and wire rope moving devices which move along the wellbore wall. A wire rope is arranged in the wellbore, and the rope-climbing robot is arranged on the wire rope as a mobile node. The rope-climbing robot can rise, descend, suspend, or the like on the wire rope; and the wire rope moving devices can move along the wellbore wall, thus realizing internal inspection of the whole wellbore. Because the wire rope moving devices respectively mounted on the ground and underground move out of synchronization, the wire rope may be offset during operation due to different movement speeds of the surface and underground moving devices, or even is wrapped around working equipment in the wellbore.

SUMMARY

In view of this, the present invention provides a method for movement synchronization control over tracks of a wellbore inspection system, so as to solve the problem mentioned above in the prior art.

To achieve the foregoing objective, the present invention adopts the following technical solutions.

A movement-synchronized wellbore inspection system includes: a rope-climbing robot, a wire rope, a ground wire rope moving device, a ground wire rope moving track, an underground wire rope moving device, an underground wire rope moving track, an inertial sensor and a control device. The ground wire rope moving device is mounted in the ground wire rope moving track, and the underground wire rope moving device is mounted in the underground wire rope moving track. An upper end of the wire rope is connected to the ground wire rope moving device, and a lower end of the wire rope passes through the rope-climbing robot and is then connected to the underground wire rope moving device. The control device controls the underground wire rope moving device and the ground wire rope moving device to move in synchronization, and then the inertial sensor carried on the rope-climbing robot detects posture data of the wire rope and transmits the data to the control device. The control device first calculates, according to the received posture data of the wire rope, an included angle between an axis of a local coordinate system and a horizontal plane in a natural coordinate system. Then, adjusts operation speeds of the ground wire rope moving device and the underground wire rope moving device according to the included angle until the included angle there between equals 0. In this case, an axis of the wire rope is parallel to that of a wellbore, the natural coordinate system is a three-dimensional coordinate system established with a joint between the wire rope and the ground wire rope moving device as an origin. The local coordinate system is a three-dimensional coordinate system established with a point on the wire rope corresponding to the center of the rope-climbing robot as an origin.

Further, the underground wire rope moving device and the ground wire rope moving device are identical in structure, and each includes a housing, a drive motor, and a plurality of moving rollers. A wire rope locking mechanism capable of firmly clamping the wire rope is provided on the housing. The moving rollers include a driving roller and one or more driven rollers.

Each moving roller is positioned and supported by a roller shaft which is mounted in the housing via a bearing; a drive motor base is fixedly mounted on the housing, and a power output end of the drive motor is connected via a reducer to the roller shaft which supports the driving roller; and the control device controls, according to the included angle $\theta_z$, operation states of the drive motors of the underground wire rope moving device and the ground wire rope moving device, such that the underground wire rope moving device and the ground wire rope moving devices move in synchronization.

Further, the underground wire rope moving device and the ground wire rope moving device are each provided with a guide mechanism; the guide mechanism includes a transverse guide mechanism and a longitudinal guide mechanism; the transverse guide mechanism includes a transverse guide support and a transverse guide roller; the transverse guide support is connected to the housing at one end and further connected to the transverse guide roller at the other end, and the transverse guide roller is axially parallel to a rolling surface where the moving rollers are located; the longitudinal guide mechanism includes a longitudinal guide support and a longitudinal guide roller; the longitudinal guide support is connected to the housing at one end and further connected to the longitudinal guide roller at the other end, and the longitudinal guide roller is axially perpendicular to a rolling surface where the moving rollers are located.

Driven by the drive motor, the driving roller operates in cooperation with the transverse guide mechanism and the longitudinal guide mechanism to implement positioning and guiding, thus driving the driven rollers to always move along the wire rope moving tracks.

Further, the ground wire rope moving track or the underground wire rope moving track further includes a transverse guide surface and a longitudinal guide surface. One side of the rolling surface is provided with the longitudinal guide surface perpendicular to the rolling surface, and the other side of the rolling surface is provided with an L-shaped groove at a turning portion, and the L-shaped groove is formed by a vertical part and a transverse part. An extension direction of the vertical part is perpendicular to the rolling surface, and an opening of the vertical part is flush with the rolling surface; an extension direction of the transverse part is parallel to the rolling surface, and the transverse part has the transverse guide surface parallel to the rolling surface;

the moving rollers are directly provided above the rolling surface; the transverse guide support is disposed in the vertical part of the groove, and the transverse guide roller is disposed in the transverse part; one end of the transverse guide support extends out of the vertical part and is then connected to the housing, and the other end of the transverse guide support is connected to the transverse guide roller hooked onto the transverse guide surface. The transverse guide roller is connected to the transverse guide surface via a wire, and the longitudinal guide roller is connected to the longitudinal guide surface via a wire; and driven by the drive motor, the driving roller can drive the transverse guide roller to roll along the transverse guide surface, drive the longitudinal guide roller to roll along the longitudinal guide surface, and drive the driven rollers to roll along the rolling surface.

Further, the housing is designed in a circular sector shape, and the roller shafts are distributed in a radial direction of the circular-sector-shaped housing; two radial section ends of the circular-sector-shaped housing are both provided with a fixing rack, and each fixing rack is provided with one longitudinal guide mechanism and one transverse guide mechanism; the longitudinal guide mechanism is provided on an end of the fixing rack adjacent to an inner circular surface of the circular-sector-shaped housing; and the transverse guide mechanism is provided on an end of the fixing rack adjacent to an outer circular surface of the circular-sector-shaped housing; the two longitudinal guide mechanisms respectively provided on the two radial section ends of the circular-sector-shaped housing are symmetrically arranged, and the two transverse guide mechanisms respectively provided on the two radial section ends of the circular-sector-shaped housing are symmetrically arranged. An axis of the longitudinal guide roller is perpendicular to the circular-sector-shaped surface of the circular-sector-shaped housing, and an axis of the transverse guide roller is parallel to the circular-sector-shaped surface of the circular-sector-shaped housing; positions where the longitudinal guide support and the transverse guide support are disposed on the fixing rack can be adjusted in a radial direction of the circular-sector-shaped housing.

Another technical objective of the present invention is to provide a movement synchronization control method of a wellbore inspection system, which includes the following steps.

Step 1: A Preparation Phase

Arranging a rope-climbing robot at a preset position on a wire rope, testing the rope-climbing robot to check whether the rope-climbing robot operates normally; and adjusting a position of a ground wire rope moving device on a ground wire rope moving track, and a position of an underground wire rope moving device on an underground wire rope moving track, to make the axis of the wire rope and an axis of a wellbore parallel to each other;

Step 2: An Operation Phase starting the wellbore inspection system; at the beginning of operation, driving the ground wire rope moving device and the underground wire rope moving device at a same speed and in a same direction to move the wire rope around the wellbore; feeding data detected by an inertial sensor carried on the rope-climbing robot back to a control device; and processing the data by the control device to learn that an included angle is 0, which indicates that the ground wire rope moving device and the underground wire rope moving device move in synchronization;

Step 3: a movement synchronization phase after the control device processes the received data detected by the inertial sensor carried on the rope-climbing robot to obtain the included angle is not 0, which indicates that the ground wire rope moving device and the underground wire rope moving device move out of synchronization, controlling the ground wire rope moving device and the underground wire rope moving device according to a geometrical relationship between the included angle and the depth of the wellbore until the included angle equals 0, at this time, the axis of the wire rope and the axis of the wellbore are parallel to each other, where the included angle is formed between an axis of a local coordinate system and a horizontal plane in a natural coordinate system; the natural coordinate system is a three-dimensional coordinate system established with a joint between the wire rope and the ground wire rope moving device as an origin; and the local coordinate system is a three-dimensional coordinate system established with a point on the wire rope corresponding to a center of the rope-climbing robot as an origin.

Advantageous Effect (1) The method for movement synchronization control over tracks of a wellbore inspection system in the present invention has low hardware cost, and can acquire the posture of the wire rope in real time by merely using the inertial sensor carried on the rope-climbing robot, thus determining whether the wire rope is offset and further controlling the tracks of the wellbore inspection system.

(2) The method for movement synchronization control over tracks of a wellbore inspection system in the present invention resorts to software control means which is relatively advanced in technology as compared with control via a mechanical device, thus making the present invention highly extensible and universally applicable.

(3) The method of the present invention is applicable to multiple kinds of tracks, including but not limited to, gear racks, smooth tracks, and the like.

(4) In the method of the present invention, a plurality of rope-climbing robots can be arranged as required, and the posture of the plurality of rope-climbing robots can be provided by inertial sensors respectively carried on the rope-climbing robots, thus further improving the accuracy of movement synchronization between the tracks of the wellbore inspection system.

BRIEF DESCRIPTION OF THE DRAWINGS

The accompanying drawings that constitute a part of the present invention are used to improve the understanding of the present invention. The machine descriptions in the exemplary embodiments of the present invention are used to explain the present invention, but do not constitute an improper limitation on the present invention. In the drawings.

DESCRIPTION OF THE EMBODIMENTS

The present invention is further described below with reference to the accompanying drawings.

Figure 1:
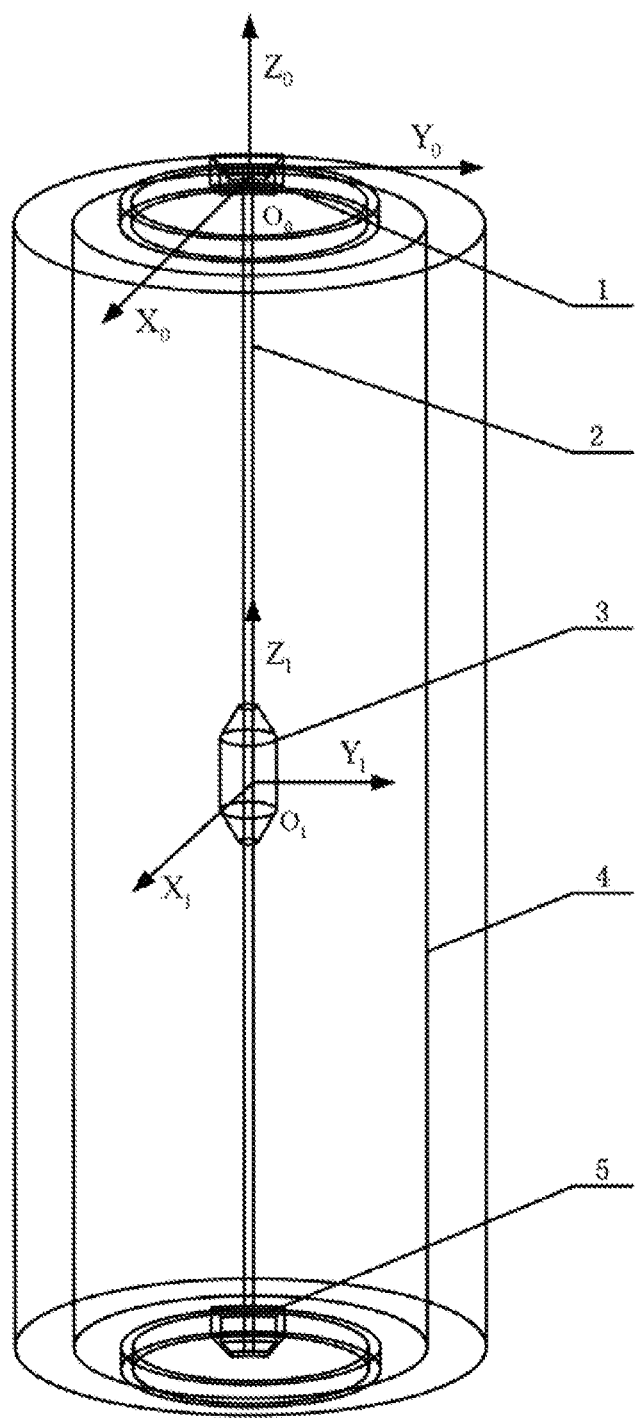
FIG. 1 is a schematic structural diagram of a movement-synchronized wellbore inspection system in an embodiment of the present invention.
Figure 2:
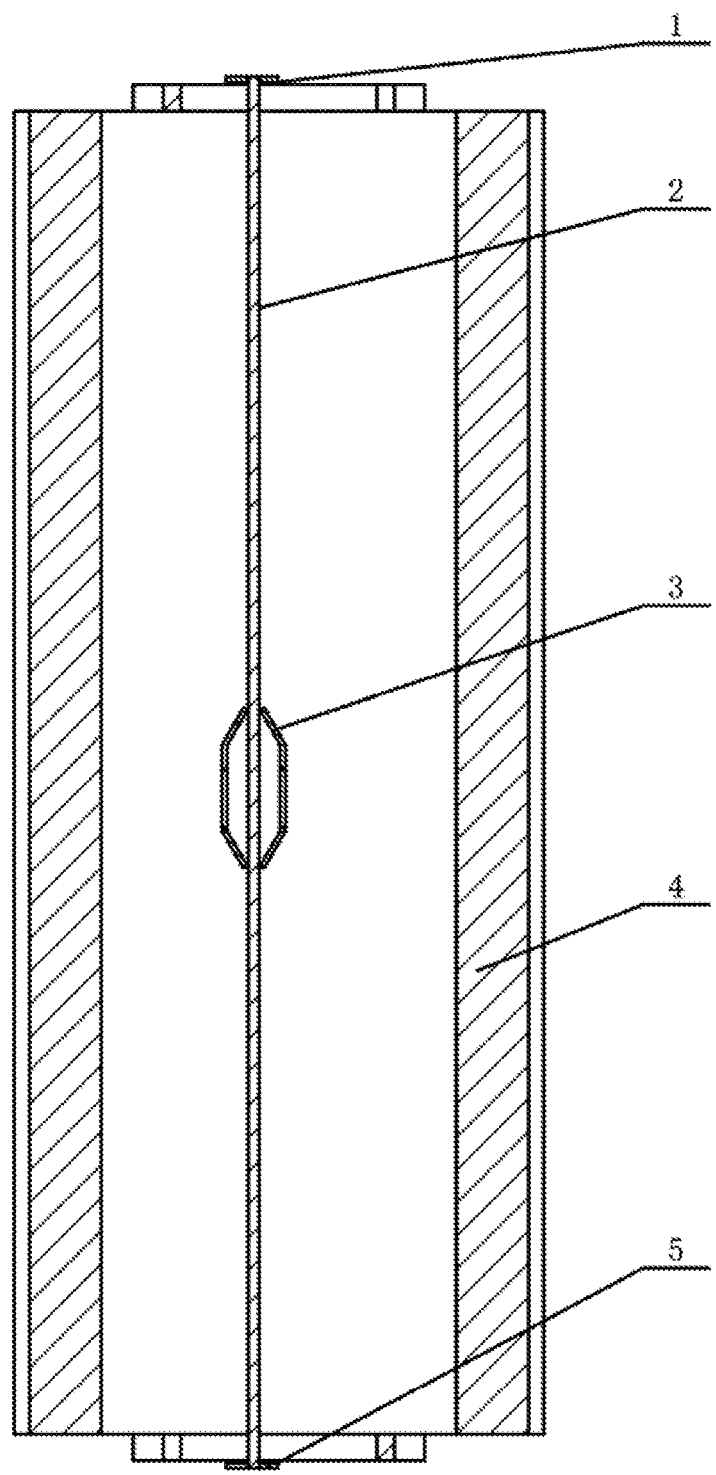
FIG. 2 is a sectional diagram of FIG. 1.
Figure 3:
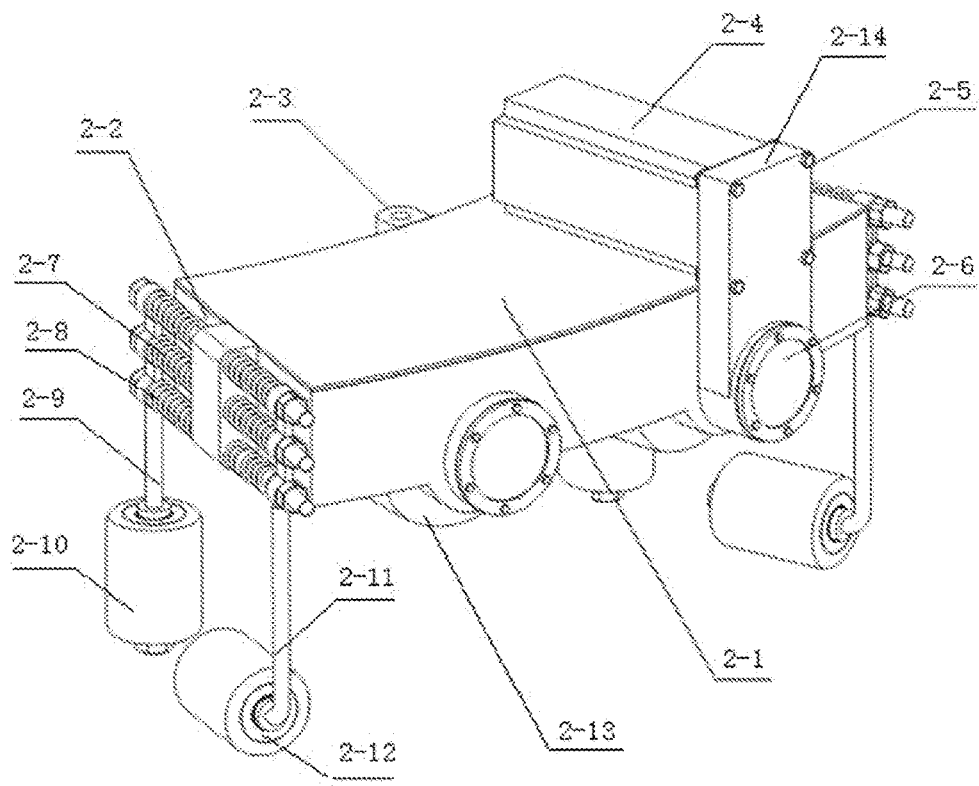
FIG. 3 is a schematic structural diagram of the surface/underground wire rope moving device in FIG. 1.
Figure 4:
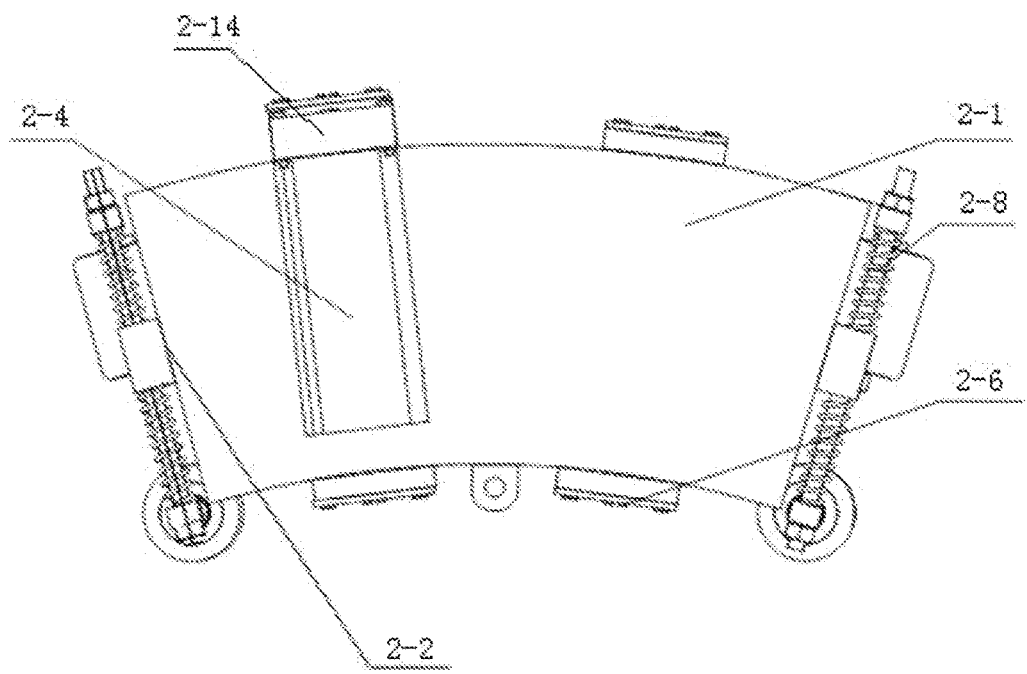
FIG. 4 is a top view of the surface/underground wire rope moving device in FIG. 1.

As shown in FIGS. 1 and 2, the present invention provides a movement-synchronized wellbore inspection system, which includes a rope-climbing robot, a wire rope, a ground wire rope moving device, a ground wire rope moving track, an underground wire rope moving device, an underground wire rope moving track, an inertial sensor, and a control device. The ground wire rope moving device is mounted in the ground wire rope moving track, and the underground wire rope moving device is mounted in the underground wire rope moving track. The upper end of the wire rope is connected to the ground wire rope moving device, and the lower end thereof passes through the rope-climbing robot and is then connected to the underground wire rope moving device. The control device controls the underground wire rope moving device and the ground wire rope moving device to move in synchronization, and then the inertial sensor carried on the rope-climbing robot detects posture data of the wire rope and transmits the data to the control device. The control device first calculates, according to the received posture data of the wire rope, an included angle $\theta_Z$ between an axis $Z_1$ of a local coordinate system $(X_1, Y_1, Z_1)$ and a horizontal plane $(X_0, O_0, Y_0)$ in a natural coordinate system $(X_0, Y_0, Z_0)$; and then adjusts operation speeds of the ground wire rope moving device and the underground wire rope moving device according to the included angle $\theta_Z$ until the included angle $\theta_Z$ therebetween equals 0. In this case, the axis of the wire rope is parallel to that of the wellbore. The natural coordinate system $(X_0, Y_0, Z_0)$ is a three-dimensional coordinate system established with a joint between the wire rope and the ground wire rope moving device as the origin; and the local coordinate system $(X_1, Y_1, Z_1)$ is a three-dimensional coordinate system established with a point on the wire rope corresponding to the center of the rope-climbing robot as the origin.

An embodiment of the present invention further provides a method for movement synchronization control over tracks of the wellbore inspection system. The rope-climbing robot 3 is arranged on the wire rope 2, and posture of the rope-climbing robot 3 can reflect posture of the wire rope 2 in real time. Therefore, an offset of the wire rope 2 may be calculated according to the posture of the rope-climbing robot 3, and then synchronization between the tracks of the wellbore inspection system is controlled according to the offset of the wire rope 2, such that the axis of the wire rope 2 and the axis of the wellbore are parallel to each other. By using the inertial sensor, the posture of the rope-climbing robot can be detected, and further linear acceleration and angular acceleration of the rope-climbing robot in three axis directions are measured.

A working process of the present invention is as follows.

Step 1 is a preparation phase. First, the rope-climbing robot 3 is arranged at a preset position on the wire rope 2, and is tested to check whether it operates normally. A position of the ground wire rope moving device 1 on the ground wire rope moving track, and a position of the underground wire rope moving device 5 on the underground wire rope moving track are adjusted, to make the axis of the wire rope 2 and the axis of the wellbore 4 parallel to each other. Finally, a wireless communication system is tested to eliminate communication delay, packet loss, and other problems of the rope-climbing robot 3, thus ensuring stable operation of the wireless communication system.

Step 2 is an operation phase. The wellbore inspection system is started. At the beginning of operation, the ground wire rope moving device 1 and the underground wire rope moving device 5 drive the wire rope at the same speed and in the same direction to move around the wellbore. In this case, the natural coordinate system $(X_0, Y_0, Z_0)$ 6 and the local coordinate system $(X_1, Y_1, Z_1)$ 7 coincide, and the axis of the wire rope 2 and the axis of the wellbore 4 are parallel. When the ground wire rope moving device 1 and the underground wire rope moving device 5 move out of synchronization, the wire rope 2 is offset such that the axis $Z_1$ of the local coordinate system $(X_1, Y_1, Z_1)$ 7 is offset, while the axes $X_1$ and $Y_1$ are not offset. An included angle between the axis $Z_1$ and the horizontal plane $(X_0, O_0, Y_0)$ in the natural coordinate system $(X_0, Y_0, Z_0)$ 6 is set to $\theta_Z$, and this angle $\theta_Z$ can be measured by using the inertial sensor carried on the rope-climbing robot 3. Then, data information detected by the inertial sensor is sent by the wireless communication system to a control center. The natural coordinate system $(X_0, Y_0, Z_0)$ is a three-dimensional coordinate system established with a joint between the wire rope and the ground wire rope moving device as the origin; and the local coordinate system $(X_1, Y_1, Z_1)$ is a three-dimensional coordinate system established with a point on the wire rope corresponding to the center of the rope-climbing robot as the origin.

Step 3 is a movement synchronization phase. Upon receiving the data information detected by the inertial sensor, the control center first performs filtering processing on the data information to filter out interference with the data information caused by vibration of the wire rope, then determines the posture of the wire rope 2 according to the included angle $\theta_Z$, and finally adjusts the ground wire rope moving device 1 and the underground wire rope moving device 5 according to the depth of the wellbore 4. If the included angle $\theta_Z$ is 0 after detection, it indicates that the axis of the wire rope 2 and the axis of the wellbore 4 are parallel. In this case, it is not required to adjust the ground wire rope moving device 1 and the underground wire rope moving device 5, merely requiring to maintain the original operation speed. On the contrary, if the included angle $\theta_Z$ is not 0 after detection, it indicates that the wire rope 2 is offset, and the ground wire rope moving device 1 and the underground wire rope moving device 5 move out of synchronization. In this case, it is required to control the ground wire rope moving device 1 and the underground wire rope moving device 5 according to a geometrical relationship between the included angle $\theta_Z$ and the depth of the wellbore 4. By adjusting the operation speeds of the ground wire rope moving device 1 and the underground wire rope moving device 5, the axis of the wire rope 2 and the axis of the wellbore 4 are made to be parallel, thus implementing movement synchronization control over tracks of the wellbore inspection system.

As shown from FIG. 3 to FIG. 6, the ground wire rope moving device/the underground wire rope moving device (collectively referred to as a wire rope moving device below for ease of description) of the present invention includes a housing, a drive motor, and a plurality of moving rollers. The size and number of the moving rollers may be determined according to a specific load, and the outer edge of each moving roller may be coated with polyurethane or another cushioning material to alleviate an impact of the vibrating wire rope moving device on the wire rope moving track. Two moving rollers are shown in the figures.

The housing is provided with a wire rope locking mechanism which is used to firmly clamp the wire rope for the robot to climb. The wire rope locking mechanism may be a commercially available wire rope stopper, or may also be another mechanism for locking and limiting. There may be one, or two or more wire rope stoppers. When there is only one wire rope moving track, at least two wire rope stoppers are required, such that the wire rope with the robot climbing thereon can conveniently move in the wellbore.

The moving rollers include a driving roller 2-15 and one or more driven rollers 2-13 (there is only one driven roller 2-13 in the figure). Each moving roller is positioned and supported by a roller shaft which is mounted in the housing via a bearing 2-16. A drive motor base is fixedly mounted on the housing, and a power output end of the drive motor 2-4 is connected via a reducer 2-14 to the roller shaft which supports the driving roller 2-15. Driven by the drive motor 2-4, the driving roller 2-15 can drive the driven rollers 2-13 to move along the wire rope moving track 8.

Specifically, the driven roller 2-13 is connected to the housing via the roller shaft and a cylindrical roller bearing, and is axially limited at the two ends respectively via bearing end covers. The driving roller 2-15 is connected to the housing via the roller shaft and the cylindrical roller bearing; and is axially limited at one end via a bearing end cover and is connected to the reducer 2-14 at the other end. Power of the drive motor 2-4 is transmitted from the drive motor 2-4 to the driving roller 2-15 via the reducer 2-14.

In order that the wire rope moving device can move on the wire rope moving track along a preset trajectory (namely, the circumference of the wellbore wall), the wire rope moving device of the present invention is provided with a guide mechanism which includes a transverse guide mechanism and a longitudinal guide mechanism. The longitudinal guide mechanism is used to realize longitudinal (in an axial direction of the wellbore) positioning between the wire rope moving device and the wire rope moving track, thus preventing a lateral offset of the wire rope moving device. The transverse guide mechanism is used to realize transverse (in a direction perpendicular to the axial direction of the wellbore) positioning between the wire rope moving device and the wire rope moving track.

Figure 5:
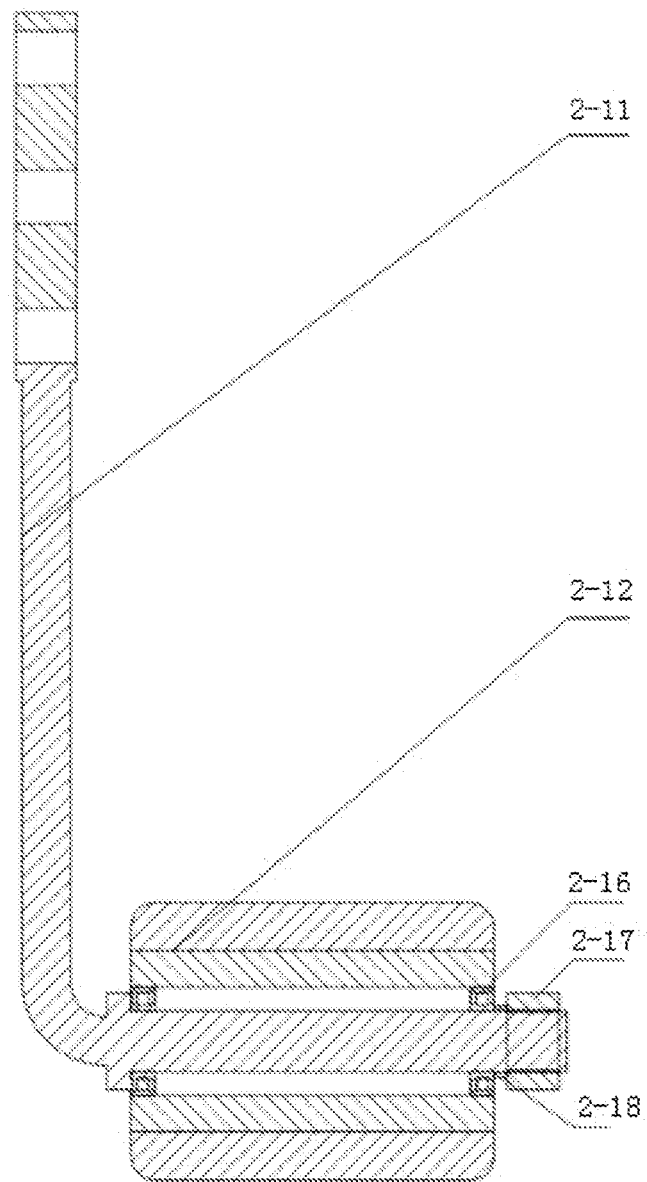
FIG. 5 is a schematic structural diagram of a transverse guide mechanism.

The transverse guide mechanism includes a transverse guide support 2-11 and a transverse guide roller 2-12. The transverse guide support 2-11 is connected to the housing at one end and connected to the transverse guide roller 2-12 at the other end; and the transverse guide roller 2-12 is axially parallel to a rolling surface where the moving rollers are located. Specifically, as shown in FIG. 5, the transverse guide support 2-11 is an L-shaped rod which is formed by a vertical section (a section of the L-shaped rod that is parallel to the axial direction of the wellbore) and a transverse section (a section of the L-shaped rod that is parallel to the transverse direction of the wellbore). The vertical section is connected to the housing and the transverse section is provided with a shaft shoulder. The transverse section at the outer side of the shaft shoulder is provided with the transverse guide roller 2-12, and a bearing is mounted between the transverse guide roller 2-12 and the transverse section. The transverse section at the outer side of the transverse guide roller 2-12 is provided with a limiting nut 2-17 in a threaded connection manner. Thus, it can be thus indicated that the transverse guide roller 2-12 is positioned via the shaft shoulder at one side and is positioned via the limiting nut 2-17 at the other side. The longitudinal guide mechanism includes a longitudinal guide support 2-9 and a longitudinal guide roller 2-10. The longitudinal guide support 2-9 is connected to the housing at one end and further connected to the longitudinal guide roller 2-10 at the other end, and the longitudinal guide roller 2-10 is axially perpendicular to a rolling surface where the moving rollers are located. Driven by the drive motor 2-4, the driving roller 2-15 operates in cooperation with the transverse guide mechanism and the longitudinal guide mechanism to implement positioning and guiding, thus driving the driven rollers 2-13 to always move along the wire rope moving track 8.

Figure 6:
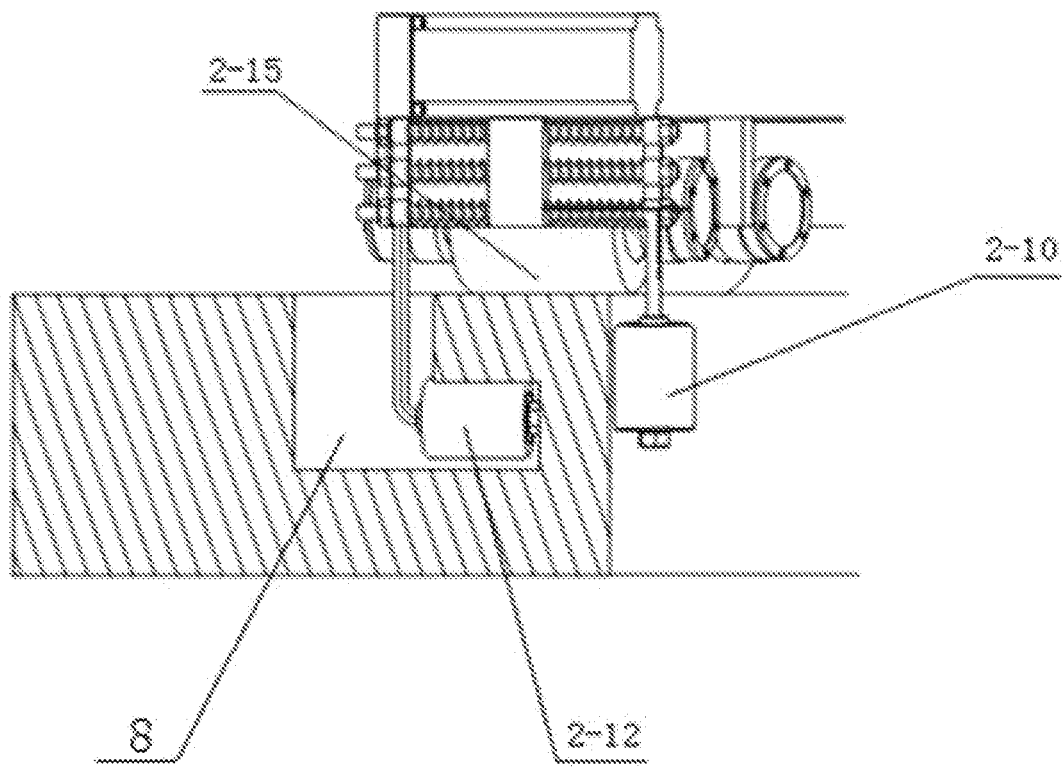
FIG. 6 is a structural cross-sectional enlarged view showing that a wire rope moving device is mounted in a wire rope moving track.

For ease of mounting of the moving rollers of the wire rope moving device and the guide rollers (including the transverse guide roller and the longitudinal guide roller) of the guide mechanism, as shown in FIG. 6, the wire rope moving track of the present invention includes a rolling surface, a transverse guide surface, and a longitudinal guide surface. One side of the rolling surface is provided with the longitudinal guide surface perpendicular to the rolling surface, and the other side thereof is provided with an L-shaped groove at a turning portion, and the L-shaped groove is formed by a vertical part and a transverse part. An extension direction of the vertical part is perpendicular to the rolling surface, and an opening of the vertical part is flush with the rolling surface. An extension direction of the transverse part is parallel to the rolling surface, and the transverse part has the transverse guide surface parallel to the rolling surface. The moving rollers are directly provided above the rolling surface. The transverse guide support is disposed in the vertical part of the groove, and the transverse guide roller is disposed in the transverse part. One end of the transverse guide support extends out of the vertical part and is then connected to the housing, and the other end of the transverse guide support is connected to the transverse guide roller hooked onto the transverse guide surface. The transverse guide roller is connected to the transverse guide surface via a wire, and the longitudinal guide roller is connected to the longitudinal guide surface via a wire. Driven by the drive motor, the driving roller can drive the transverse guide roller to roll along the transverse guide surface, the longitudinal guide roller to roll along the longitudinal guide surface, and the driven rollers to roll along the rolling surface. With such a structural design, the wire rope moving track of the present invention can provide a guide working surface (namely, the transverse guide surface and the longitudinal guide surface) for the guide rollers and further provide a movement working surface (namely, the rolling surface) for the moving rollers; and additionally provide a mounting space for the transverse guide mechanism. Moreover, by a specific mounting manner, main parts (including the housing; and the moving rollers, the drive motor, and the roller shafts which are mounted in/on the housing) of the wire rope moving device can be fitted into the wire rope moving track via the transverse guide mechanism. It can be known from the above that the transverse guide mechanism of the present invention not only has a transverse guide function, but also connects the main parts of the wire rope moving device and the wire rope moving track.

In order that the wire rope moving device can circumferentially move along the wellbore wall, the housing is designed in a circular sector shape in the present invention. Referring to FIG. 5, according to the direction shown in FIG. 5, the circular-sector-shaped housing is a semi-closed casing which has an open circular-sector-shaped lower end surface and is enclosed by an upper circular-sector-shaped plate, a left lateral plate, a right lateral plate, a front arc-shaped plate, and a rear arc-shaped plate. The left lateral plate and the right lateral plate are respectively disposed on the left and right radial section ends of the circular-sector-shaped housing; the front arc-shaped plate is located on the outer circular surface of the circular-sector-shaped housing; and the rear arc-shaped plate is located on the inner circular surface of the circular-sector-shaped housing. In this case, the drive motor is directly mounted on the upper surface of the upper circular-sector-shaped plate, and the roller shafts are distributed in a radial direction of the circular-sector-shaped housing. The moving rollers can be exposed from the open circular-sector-shaped lower end surface of the circular-sector-shaped housing, such that the moving rollers can directly contact the rolling surface of the wire rope moving track.

When a different drive motor is selected according to a different load, a motor base, a coupler, or other devices may be added as required to fix the drive motor.

In order to realize a connection between the guide mechanism and the housing and further to ensure guide stability, the two radial section ends 2-2 of the circular-sector-shaped housing of the present invention are separately provided with a fixing rack, and each fixing rack is provided with one longitudinal guide mechanism and one transverse guide mechanism. The longitudinal guide mechanism is provided on the end of the fixing rack adjacent to the inner circular surface of the circular-sector-shaped housing; and the transverse guide mechanism is provided on the end of the fixing rack adjacent to the outer circular surface of the circular-sector-shaped housing. The two longitudinal guide mechanisms respectively provided on the two radial section ends 2-2 of the circular-sector-shaped housing are symmetrically arranged, and the two transverse guide mechanisms respectively provided on the two radial section ends 2-2 of the circular-sector-shaped housing are symmetrically arranged. The axis of the longitudinal guide roller 2-10 is perpendicular to the circular-sector-shaped surface 2-1 of the circular-sector-shaped housing, and the axis of the transverse guide roller 2-12 is parallel to the circular-sector-shaped surface 2-1 of the circular-sector-shaped housing. Positions where the longitudinal guide support 2-9 and the transverse guide support 2-11 are disposed on the fixing rack can be adjusted in a radial direction of the circular-sector-shaped housing.

Specifically, each fixing rack includes one or more horizontal rods 2-8. These horizontal rods 2-8 are distributed at equal intervals in a height direction of each radial section end of the circular-sector-shaped housing, and the radial section end of the circular-sector-shaped housing is provided with a fixing block. The horizontal rods 2-8 are supported and fixed via the fixing block and arranged in a radial direction of the circular-sector-shaped housing. The two ends of each horizontal rod 2-8 are separately in threaded connection with a locking nut. The longitudinal guide support 2-9 is provided with mounting holes (a) which are respectively corresponding to the horizontal rods 2-8. The horizontal rods 2-8 are joined to the longitudinal guide support 2-9 through their respectively corresponding mounting holes (a), and a spring (a) is slipped on each horizontal rod 2-8 between the longitudinal guide support 2-9 and the fixing block. The spring (a) is disposed so as to reduce the interference with the movement of the main parts of the wire rope moving device when the longitudinal guide mechanism vibrates in operation. The transverse guide support 2-11 is provided with mounting holes (b) which are respectively corresponding to the horizontal rods 2-8. The horizontal rods 2-8 are joined to the transverse guide support 2-11 through their respectively corresponding mounting holes (b), and a spring (b) is slipped on each horizontal rod 2-8 between the transverse guide support 2-11 and the fixing block. The spring (b) is disposed so as to reduce the interference with the movement of the main parts of the wire rope moving device when the transverse guide mechanism vibrates in operation.

The above merely describes preferred embodiments of the present invention. It should be noted that, several improvements and modifications may be made by those of ordinary skill in the art without departing from the principle of the present invention, and these improvements and modifications should also be considered within the scope of protection of the present invention.

What is claimed is:

1. A movement-synchronized wellbore inspection system, comprising: a rope-climbing robot, a wire rope, a ground wire rope moving device, a ground wire rope moving track, an underground wire rope moving device, an underground wire rope moving track, an inertial sensor and a control device, wherein the ground wire rope moving device is mounted in the ground wire rope moving track, and the underground wire rope moving device is mounted in the underground wire rope moving track; an upper end of the wire rope is connected to the ground wire rope moving device, and a lower end of the wire rope passes through the rope-climbing robot and is then connected to the underground wire rope moving device; the control device controls the underground wire rope moving device and the ground wire rope moving device to move in synchronization, and then the inertial sensor carried on the rope-climbing robot detects posture data of the wire rope and transmits the data to the control device; the control device firstly calculates, according to the received posture data of the wire rope, an included angle between an axis of a local coordinate system and a horizontal plane in a natural coordinate system; and then adjusts operation speeds of the ground wire rope moving device and the underground wire rope moving device according to the included angle until the included angle therebetween equals 0; and in this case, an axis of the wire rope is parallel to an axis of a wellbore, wherein the natural coordinate system is a three-dimensional coordinate system established with a joint between the wire rope and the ground wire rope moving device as an origin; and the local coordinate system is a three-dimensional coordinate system established with a point on the wire rope corresponding to a center of the rope-climbing robot as an origin.

2. The movement-synchronized wellbore inspection system according to claim 1, wherein the underground wire rope moving device and the ground wire rope moving device are identical in structure, and each comprises a housing, a drive motor and a plurality of moving rollers; a wire rope locking mechanism capable of firmly clamping the wire rope is provided on the housing; and the moving rollers comprise a driving roller and one or more driven rollers; and
   each of the moving rollers is positioned and supported by a roller shaft which is mounted in the housing via a bearing; a drive motor base is fixedly mounted on the housing, and a power output end of the drive motor is connected via a reducer to the roller shaft which supports the driving roller; and the control device controls, according to the included angle, operation states of the drive motors of the underground wire rope moving device and the ground wire rope moving device, such that the underground wire rope moving device and the ground wire rope moving device move in synchronization.

3. The movement-synchronized wellbore inspection system according to claim 2, wherein the underground wire rope moving device and the ground wire rope moving device are each provided with a guide mechanism; the guide mechanism comprises a transverse guide mechanism and a longitudinal guide mechanism; the transverse guide mechanism comprises a transverse guide support and a transverse guide roller; the transverse guide support is connected to the housing at one end and further connected to the transverse guide roller at the other end, and the transverse guide roller is axially parallel to a rolling surface where the moving rollers are located; the longitudinal guide mechanism comprises a longitudinal guide support and a longitudinal guide roller; the longitudinal guide support is connected to the housing at one end and further connected to the longitudinal guide roller at the other end, and the longitudinal guide roller is axially perpendicular to a rolling surface where the moving rollers are located; and driven by the drive motor, the driving roller operates in cooperation with the transverse guide mechanism and the longitudinal guide mechanism to implement positioning and guiding, so as to drive each of the driven rollers to always move along the ground wire rope moving track and the underground wire rope moving track.

4. The movement-synchronized wellbore inspection system according to claim 3, wherein the ground wire rope moving track or the underground wire rope moving track further comprises a transverse guide surface and a longitudinal guide surface; one side of the rolling surface is provided with the longitudinal guide surface perpendicular to the rolling surface, and the other side of the rolling surface is provided with an L-shaped groove at a turning portion, the L-shaped groove is formed by a vertical part and a transverse part; an extension direction of the vertical part is perpendicular to the rolling surface, and an opening of the vertical part is flush with the rolling surface; an extension direction of the transverse part is parallel to the rolling surface, and the transverse part has the transverse guide surface parallel to the rolling surface; the moving rollers are directly provided above the rolling surface; the transverse guide support is disposed in the vertical part of the groove, and the transverse guide roller is disposed in the transverse part; one end of the transverse guide support extends out of the vertical part and is then connected to the housing, and the other end of the transverse guide support is connected to the transverse guide roller hooked onto the transverse guide surface; the transverse guide roller is connected to the transverse guide surface via a wire, and the longitudinal guide roller is connected to the longitudinal guide surface via a wire; and driven by the drive motor, the driving roller is able to drive the transverse guide roller to roll along the transverse guide surface, drive the longitudinal guide roller to roll along the longitudinal guide surface, and drive the driven rollers to roll along the rolling surface.

5. The movement-synchronized wellbore inspection system according to claim 4, wherein the housing is designed in a circular-sector-shape, and the roller shafts are distributed in a radial direction of the circular-sector-shaped housing; two radial section ends of the circular-sector-shaped housing are both provided with a fixing rack, and each fixing rack is provided with one longitudinal guide mechanism and one transverse guide mechanism; the longitudinal guide mechanism is provided on an end of the fixing rack adjacent to an inner circular surface of the circular-sector-shaped housing; and the transverse guide mechanism is provided on an end of the fixing rack adjacent to an outer circular surface of the circular-sector-shaped housing; the two longitudinal guide mechanisms respectively provided on the two radial section ends of the circular-sector-shaped housing are symmetrically arranged, and the two transverse guide mechanisms respectively provided on the two radial section ends of the circular-sector-shaped housing are symmetrically arranged; an axis of the longitudinal guide roller is perpendicular to the circular-sector-shaped surface of the circular-sector-shaped housing, and an axis of the transverse guide roller is parallel to the circular-sector-shaped surface of the circular-sector-shaped housing; positions where the longitudinal guide support and the transverse guide support are disposed on the fixing rack are adjustable in the radial direction of the circular-sector-shaped housing.

6. A movement synchronization control method of a wellbore inspection system, characterized by comprising following steps:

step 1: a preparation phase wherein the step 1 includes arranging a rope-climbing robot at a preset position on a wire rope, testing the rope-climbing robot to check whether the rope-climbing robot operates normally; and adjusting a position of a ground wire rope moving device on a ground wire rope moving track, and a position of an underground wire rope moving device on an underground wire rope moving track, to make an axis of the wire rope and an axis of a wellbore parallel to each other;

step 2: an operation phase wherein the step 2 includes starting the wellbore inspection system; at the beginning of operation, driving the ground wire rope moving device and the underground wire rope moving device at a same speed and in a same direction to move the wire rope around the wellbore; feeding data detected by an inertial sensor carried on the rope-climbing robot back to a control device; and processing the data by the control device to learn that an included angle is 0, which indicates that the ground wire rope moving device and the underground wire rope moving device move in synchronization;

step 3: a movement synchronization phase wherein the step 3 includes after the control device processes the received data detected by the inertial sensor carried on the rope-climbing robot to obtain the included angle is not 0, which indicates that the ground wire rope moving device and the underground wire rope moving device move out of synchronization, controlling the ground wire rope moving device and the underground wire rope moving device according to a geometrical relationship between the included angle and a depth of the wellbore until the included angle equals 0, at this time, the axis of the wire rope and the axis of the wellbore are parallel to each other, wherein the included angle is formed between an axis of a local coordinate system and a horizontal plane in a natural coordinate system; the natural coordinate system is a three-dimensional coordinate system established with a joint between the wire rope and the ground wire rope moving device as an origin; and the local coordinate system is a three-dimensional coordinate system established with a point on the wire rope corresponding to a center of the rope-climbing robot as an origin.

\* \* \* \* \*